US011427128B2

(12) United States Patent
Crandall (10) Patent No.: US 11,427,128 B2
(45) Date of Patent: Aug. 30, 2022

(54) SUPPORT DEVICES FOR A VEHICLE AND RELATED METHODS

(71) Applicant: Cord Group LLC, Placentia, CA (US)

(72) Inventor: Robert Crandall, Yorba Linda, CA (US)

(73) Assignee: Cord Group LLC, Placentia, CA (US)

( * ) Notice: Subject to any disclaimer, the term of this patent is extended or adjusted under 35 U.S.C. 154(b) by 108 days.

(21) Appl. No.: 16/928,890

(22) Filed: Jul. 14, 2020

(65) Prior Publication Data

US 2020/0339204 A1 Oct. 29, 2020

Related U.S. Application Data

(63) Continuation of application No. 16/670,742, filed on Oct. 31, 2019, now abandoned.

(60) Provisional application No. 62/753,196, filed on Oct. 31, 2018.

(51) Int. Cl.
| | |
|---|---|
| *B62D 3/00* | (2006.01) |
| *B60R 19/42* | (2006.01) |
| *B60R 3/00* | (2006.01) |
| *B62D 65/16* | (2006.01) |
| *B62D 23/00* | (2006.01) |
| *B62D 21/15* | (2006.01) |

(52) U.S. Cl.
CPC .............. *B60R 3/002* (2013.01); *B60R 19/42* (2013.01); *B62D 21/155* (2013.01); *B62D 23/005* (2013.01); *B62D 65/16* (2013.01)

(58) Field of Classification Search
CPC ....... B60R 3/002; B60R 19/42; B62D 21/157; B62D 23/005; B62D 65/16
USPC .................. 296/187.12, 193.01, 193.05, 209
See application file for complete search history.

(56) References Cited

U.S. PATENT DOCUMENTS

| | | | | |
|---|---|---|---|---|
| 8,641,068 | B1* | 2/2014 | Bundy | B60R 3/002 280/163 |
| 8,833,839 | B2* | 9/2014 | Young | B62D 25/025 296/187.08 |
| 2005/0093343 | A1* | 5/2005 | Tokumoto | B60R 13/04 296/209 |
| 2007/0085376 | A1* | 4/2007 | Kuntze | B60R 3/002 296/163 |

* cited by examiner

*Primary Examiner* — Jason S Daniels
(74) *Attorney, Agent, or Firm* — Klein, O'Neill & Singh, LLP

(57) ABSTRACT

A support device having an elongated support member for providing protection to an underside of a vehicle. The vehicle can have one or more pinch welds, such as a vehicle with a unibody chassis. The support device can serve as a rock rail to distribute a point load from an external object, such as a rock or a boulder, to a larger area of the vehicle to minimize high loading forces to a single point. The support device can alternatively be a running board.

7 Claims, 5 Drawing Sheets

SUPPORT DEVICES FOR A VEHICLE AND RELATED METHODS

FIELD OF ART

The field of the invention relates to systems and methods for a rock rail and step assist for a vehicle.

BACKGROUND

Vehicles provide transportation for people and objects over distances. Vehicles can be used both on-road and off-road. In off-road uses, vehicles can often come across rocky terrain with outcrops. Additionally, some vehicles may be used for crawling or traversing rock piles and boulders. Traditionally, many vehicles were manufactured using a body on frame construction method. Typical examples of vehicles with body on frame construction methods include pickup trucks, sport-utility vehicles, and other off-road vehicles. Body on frame is where a relatively rigid frame or chassis carries the engine and drivetrain, and a separate body, including the passenger compartment, is mounted to the frame. Vehicles using body on frame have typically been the main type used for traveling off-road. In these types of vehicles, rock rails, or rock sliders, providing impact or sliding protection from rocks can be mounted to the rigid frame. The rock rails can serve as guard rails for the vehicle. Instead of having a rock or boulder contacting the frame or body of the vehicle, the rock rails, located below the frame, can take the contact and help distribute the force of the contact.

However, many vehicles now utilize a unibody chassis, or unitized body, construction method. A unibody chassis vehicle uses a one piece frame and body structure, without a separate frame, although it does not mean that the frame is made from a single piece of metal. For a unibody construction, the entire unitized body is load bearing. Repairs of a unibody structure require more specialization and can be more time consuming than repair to a body on frame due to the entire unitized body being load bearing. Additionally, the unibody structure eliminates the separate frame to which rock rails can be mounted. Instead, on the underside of a unibody chassis vehicle, there are typically pinch welds on either side of the vehicle where sections of the unitized body are joined together. Typically, portions of the pinch welds are reinforced for the ability to use a floor jack to lift the vehicle. However, the pinch welds are typically not as rigid as a frame of a body on frame vehicle and can buckle or fold if subjected to a sufficiently high localized force or load.

Additionally, vehicles with sufficient ground clearance or height to go off-road and use rock rails are typically high from the ground. As such, these vehicles may present a challenge for entry and exit into the passenger compartment. In these types of vehicles, the passenger compartment or compartments may be located at a height, which makes entry and exit challenging for children, the elderly or infirm and even normal abled-body adults.

SUMMARY

Support devices, particularly running boards for use as rock rails, and attached steps for fitment with vehicles are disclosed. In particular, support devices for fitment with unibody vehicles are disclosed. However, the disclosed support devices can optionally be used with a body on frame construction.

U.S. Pat. No. 9,333,919, which is expressly incorporated herein by reference in its entirety, discloses features of support devices and lighting elements usable with the support devices. The features of the present disclosure can be understood in the context on the incorporated reference. For example, mounting brackets and steps can be attached and fixed to an elongated member or be adjustable along the length of the elongated member, as described in the '919 patent.

Additionally, U.S. application Ser. No. 16/059,997, filed Aug. 9, 2018, published as U.S. No. 2019/0047477, which is expressly incorporated herein by reference in its entirety, discloses features of steps for fitment with a vehicle. The features of the steps can be applied to the support device of the present disclosure.

Aspects of the invention include a support device for a vehicle comprising: a support member defined by a plurality of walls including a support wall, the support member being elongated and including a pinch weld channel having a support surface and at least one extended side wall extending from the support surface, and a side channel spaced from the pinch weld channel; wherein the pinch weld channel is located above, elevation-wise, the support wall and the support wall extends from the support surface at an angle to the support wall; wherein the side channel has a recessed groove for receiving a gap filler.

The support wall of the support device can comprise an I-beam cross sectional shape.

A bracket can be welded to or secured to the support member, the bracket can have a mounting flange for mounting the support member to an underside of a vehicle. The bracket can have a flange with bolt holes for receiving fasteners.

Two or more brackets can be welded to the elongate support member or fastened to the elongate support member.

A step can extend laterally from the elongate support member.

A non-metallic gap filler can be located in the pinch weld channel.

A non-metallic side gap filler having a head portion and a stem portion, and wherein the stem portion can be located in the recessed groove of the side channel.

The head portion of the side gap filler can be hollow.

A rib wall can be located internally of a body defined by the plurality of walls. The rib wall can attach to one of the plurality of walls of the support member.

A further aspect of the invention is a support device for a vehicle, said support device comprising: an extruded metallic support member having a body with a length and a top wall having a top wall with a top surface, a top wall first end, and a top wall second end; a rigid extension extending above the top wall top surface at the top wall first end; a side channel having a recessed groove located at the top wall second end and spaced from the rigid extension; a load bearing structure located directly below, elevation-wise, the rigid extension having a surface for transferring a point load on the surface to the rigid extension; wherein the rigid extension has a terminal end that is located above, elevation-wise, the side channel when the support device is mounted to a side of a vehicle.

The load bearing structure can comprise an I-beam cross sectional shape.

A sloped sidewall can be located below, elevation-wise, the side channel.

A bracket can be coupled to or welded to the support member, the bracket can have a flange for attaching the support member to a vehicle.

A step can extend laterally from the elongated support member.

A second bracket can be spaced from the bracket and a third bracket can be spaced from the second bracket.

An edge guard can be located at the terminal end of the rigid extension.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of support devices and components thereof provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
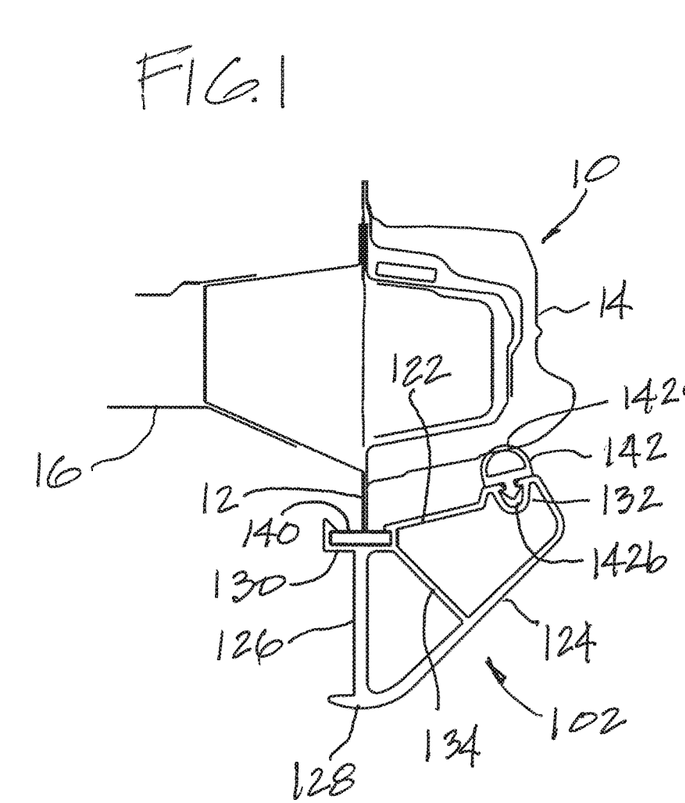
FIG. 1 is a front plan view of an exemplary embodiment of a support member of a support device of the present disclosure attached to a vehicle.
Figures 3, 4:
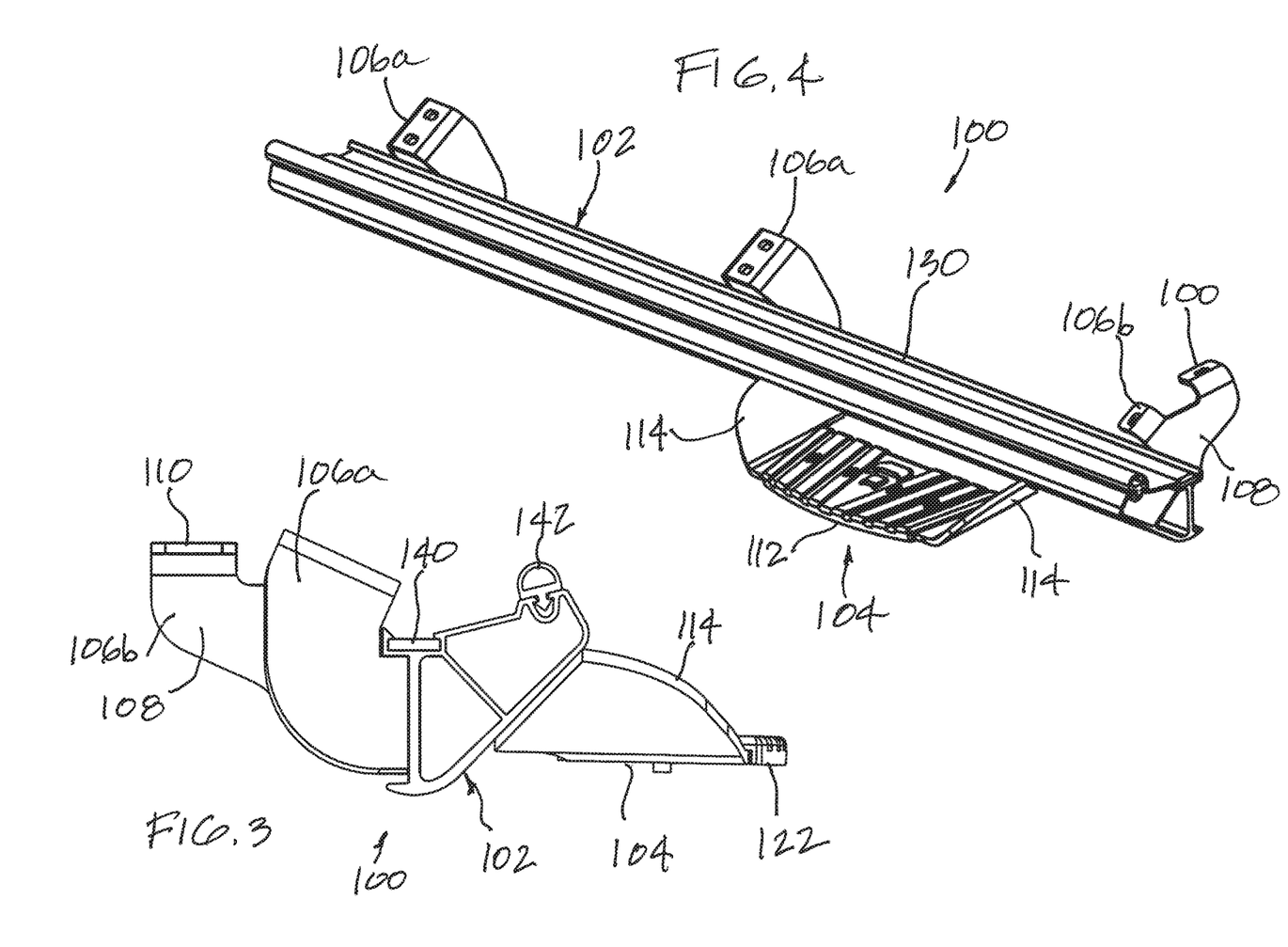
FIG. 3 is a front plan view of an exemplary embodiment of a support device comprising a support member, mounting brackets, and a step.
FIG. 4 is a perspective view of a support device according to the embodiment of FIG. 3.

FIG. 1 is a front partial cross-sectional of an exemplary embodiment of an elongated support member 102 of a support device 100 of the present disclosure attached to a vehicle 10, which is shown in schematic and can represent any number of vehicles, such as SUVs, trucks, cross-overs, and even automobiles. An exemplary embodiment of the support device 100 with the support member 102, brackets 106a, 106b, and a step 104 is shown in FIGS. 3 and 4. The support device 100 can also be referred to as a running board. As the support member 102 of the support device 100 is configured to spread a point load, such as when hitting a rock or an outcrop, over a larger range, such as over the length of the support member 102, the support device may be called or considered a rock rail.

Figure 2:
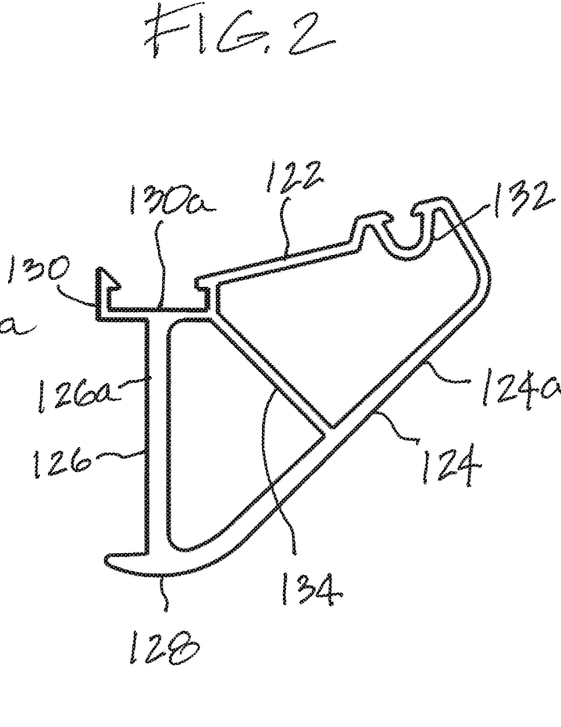
FIG. 2 is a front plan view of an exemplary embodiment of the support member of the support device of FIG. 1.

In an example, the support member 102 of the support device 100 can be an elongated extruded member, such as an extruded aluminum member having a length that is sufficient for use on a vehicle. With reference to FIGS. 1 and 2, the support member 102 can have a body with a top wall 122, a side wall 124, and a support wall 126. The walls may have distinct transitions between them or can have smooth transitions between them. More generally, the various walls may be referred to as a first wall 122, a second wall 124, and a third wall 126. As shown, the walls have distinct transitions. The support wall 126 may have an I-beam shape rigid body 126a with a bottom end 128 and a pinch weld channel 130 at a top end, which is elevated above the bottom end. In an example, the load bearing body part of the I-beam 126a is arranged to align directly below or subjacent the pinch weld channel 130, which has a planar surface 130a that is generally orthogonal to the I-beam shape rigid body 126a. The planar surface 130a of the weld channel 130 has a width and a length. One or more wall surfaces or wall extensions can extend from the planar surface 130a to define the channel 130 above the load bearing body 126a of the I-beam. In some examples, rather than an I-beam shape rigid body, the support wall 126 may have a different shape, such as a tube. If different shapes are used as the load bearing body part, the different shaped part should be made to locate directly below the pinch when installed.

The rock rail 100 can be powder coated to a desired color. In some examples, when the rock rail 100 is mounted to a vehicle, such as to a truck or an SUV, the exterior surface 124a of the side wall 124 and/or the bottom end 128 of the support member 102 can be expected to rub or bang against a hard surface, such as against rocks and/or outcrops. By using an aluminum material, the support member 102 can resist rust, since no ferrous metal is used that can be exposed to oxidize and rust. In some examples, a sleeve or a strip of stainless steel material having matching shape as the exterior surface 124a of the side wall 124 may be secured to the exterior surface 124a, such as by using screws or fasteners to provide a harder surface to resist wear or scrapes.

With reference to FIG. 4 in addition to FIG. 2, the pinch weld channel 130 can extend substantially the length of the support member 102 to support the pinch weld or welds on a typical side of a vehicle, or at least be provided at locations where pinch welds are located on a vehicle. In an example, the pinch weld channel 130 runs the length of the support member 102 and is configured to abut a lower end edge of the pinch weld 12, as shown in FIG. 1. Thus, when mounted, any point load pushing up against the support member 102 will distribute that load along the length of the support member onto or to the length of the pinch weld 12, which typically runs between the front and rear wheel wells of the vehicle 10. This in turn will help to avoid damage to the pinch weld should the vehicle be used off-roading and then coming into contact with rocks or outcrops.

A rib wall 134 (FIG. 2) may extend from the pinch weld channel 130 to the side wall or the second wall 124 of the support member 102 to provide added structural rigidity to the support member 102. In an example, the rib wall 134 extends from the planar surface 130a of the pinch weld channel 130 towards the second wall 124. In other examples, the rib wall 134 extends from the I-beam rigid body 126a or at the intersection between the I-beam rigid body 126a and the planar surface 130a. The rib wall 134 may be positioned such that it creates a truss structure with the top wall 122, the side wall 124, and the support wall 126. In some examples, there can be two or more internal rib walls 134 to provide added structural rigidity. Each of the two or more internal rib walls can have two ends and the two ends can attach at different internal surfaces of the support member. Optionally, at least two ends of two or more internal rib walls can converge, touch, or originate from generally the same starting point.

In exemplary embodiments, the support member 102 has a cross section with a triangular shape or an inverse trapezoid profile having a hollow interior defined by the top wall 122, the side wall 124, and the support wall 126. For use as a rock rail, the side wall 124 of the support member 102 is preferably angled or tapered relative to the ground to deflect any impact to the rock rail that may hit the side wall 124 from below. When an impact does hit the rock rail squarely from below, such as when a rock hits the bottom end 128 (FIG. 2), then the design of the present support member pushing up against the pinch weld 12 of the chassis will help to disperse the point load to a larger distributed load so as to avoid high impact concentration at a single point.

In an alternative embodiment, the support member 102 may have a different cross-sectional shape, such as a semi-circle shape, an irregular shape, or a rectangular shape provided a load bearing body part of an I-beam is aligned with, such as being located subjacent and generally vertically aligned with, a pinch weld channel and the pinch weld when installed to an underside of a chassis. In other words, the support member 102 can have more than three side walls 122, 124, 126 and more than one internal rib wall 134 with at least one of the side walls being a load bearing wall arranged to be inline or aligned with a pinch weld 12, such as being generally arranged along a straight line or generally vertically with the pinch weld so that any load on the support member when pushed from underneath, such as when bottoming out against a rock, can transfer to the pinch weld. As alluded to, a different load bearing structure, such as a heavy-gauge round aluminum pipe or tubing can be used instead of the I-beam shape rigid structure 126a. In still other examples, the support structure can have a solid body.

In an exemplary embodiment, the support member 102 comprises extruded metal. In a particular example, the support member 102 may be made of or made from extruded aluminum. Additionally, in some embodiments, the support member 102 may comprise a composite material. Alternatively, the support member 102 may be made of a composite material or a rigid polymer, such as polyether ether ketone (PEEK) or ultra-high-molecular-weight polyethylene (UHMW). Optionally, the support member 102 can be made from both a metal material, such as aluminum, and a composite material. As discussed above, a stainless steel cladding or cover may be placed on the exterior of the sidewall 124 to protect the sidewall from direct damage when coming into contact with a rock or other objects.

In fitment or assembly of the support member 102 with a vehicle, the support wall 126 can be positioned or aligned directly underneath the pinch weld 12 of the vehicle such as that load pushing up on the support member is transferred directly and generally vertically to the pinch weld, and distributed over the length or longer range of the support member and length or point on the pinch weld. The pinch weld 12 of the vehicle 10 may join sections of the underside 16 and the side 14 of the vehicle 10. It is recognized as one of the stronger parts of a unibody construction. The pinch weld 12 may fit into the pinch weld channel 130 at the upper end of the support wall 126. The pinch weld channel 130 is sufficiently wide so that the pinch weld fits between the two wall extensions extending vertically from the planar surface 130a of the pinch weld channel 130. The pinch weld channel 130 can be sized to have a width from approximately 105% to 1000% of a width of the pinch weld 12, or even larger especially when the pin weld is not terminated with an enlarged end. In some embodiments, the wider width of the pinch weld channel 130 may allow for more universal fitment across a range of vehicles having different pinch weld ends.

In an example, a pinch weld gap filler 140 may be placed in the pinch weld channel 130 between the pinch weld 12 and the planar surface 130a (FIG. 2) of the support member 102. The pinch weld gap filler 140 may be made from a non-metallic material, such as a polymer material or engineered plastic, positioned in the U-shape of the pinch weld channel 130 to ensure continuous support of the pinch weld 12 along the pinch weld channel 130. The pinch weld gap filler 140 can have a thickness, a width, and a length that fit within the pinch weld channel 130. In an example, the pinch weld gap filler 140 can prevent rattling, which may result from metal on metal contact between the pinch weld 12 and the pinch weld channel 130 of the metal support member 102. In some embodiment, the gap filler 140 may be provided in layers of discrete thicknesses to allow for gap adjustments and usable as shims.

Embodiments of the pinch weld channel 130 may be a T groove. The T groove may act to retain the pinch weld gap filler 140 from falling out of the pinch weld channel 130 during transportation prior to final assembly to the vehicle 10. Alternatively, the pinch weld channel 130 may have a different groove shape, such as a U or V shaped groove or a dovetail groove.

With reference again to FIG. 1, the I-beam body 126a of the support wall 126 can be vertically aligned with the pinch weld 12. That is, the pinch weld 12 and the support wall 126 define a substantially straight line from the vehicle 10 towards the ground with some slight variation contemplated. As such, when the bottom end 128 of the support member 102 is contacted by an external object, such as a rock or a boulder during use, the force of the impact can be transmitted vertically to the pinch weld 12. The vertical alignment and force transmission from the bottom end 128, such as when the bottom end 128 is pushed on or butted up against a rock or an outcrop, to the pinch weld 12 provides the maximum rigidity and point load transfer from a small point or area to a larger range to prevent buckling or folding of the unibody when no support member is incorporated. As such, the support member 102 can serve as a rock rail to protect the vehicle 10. The vertical alignment may prevent side loading of the pinch weld 12 that would contribute to buckling or folding of the pinch weld 12. In some embodiments, the bottom end 128 may have an external radius, or be rounded, in order to roll or slide over rocks.

Adjacent the support wall 126 and extending laterally away from the vehicle 10 is the top wall 122. In some embodiments, the top wall 122 extends radially from the plane define by the load bearing body part 126a of the I-beam. The top wall 122 may extend from the pinch weld channel 130 and may extend to a side channel 132. The side channel 132 can be located remotely or spaced from the pinch weld channel 130 and can embody a U-shape or a V-shape channel. The top wall can have a first end and a second end. The pinch weld channel can be at the first end while the side channel at the second end. The side channel 132 can have a length and the length of the pinch weld channel 130 can extend generally parallel to one another. The side channel 132 can be sized and shaped to receive a stem 142b on a side gap filler 142 (FIG. 1) to affix the side gap filler to the support member 102. In other examples, the side channel 132 can embody spaced part holes or recesses that a gap filler can snap or thread into.

In some embodiments, the side channel 132 may be a T-groove. As seen in FIG. 1, the T-groove may further have a rounded or radiused bottom. Alternatively, the side channel 132 may have a different groove shape, such as a U or V shaped groove or a dovetail groove. The side channel 132 can be selected to engage a stem 142b on the side gap filler 142 in a detent-like engagement to enable securement of the side gap filler 142 to the support member 102. In an example, the stem 142a can have a mushroom head-like structure and can fit into the side channel 132 with retaining lips on the side channel 132 retaining part of the mushroom head.

The side gap filler 142 may be sized and shaped such that a head section 142a of the side gap filler 142 contacts the side 14 of the vehicle 10 when the support member 102 is fitted to the vehicle. As such, the side gap filler 142, being elongated to extend approximately the length of the support member, held at an end of the top wall 122 may also act to spread any force on the support member 102 from an external object to larger areas or sections of the vehicle 10. By having the side gap filler 142 and the top wall 122 act on the side 14 of the vehicle 10, the force acting on the pinch weld 12 though the support wall 126 can thereby be reduced.

The side gap filler 142 may comprise an external portion or head portion 142a located between the support member 102 and the vehicle 10, such as for acting to distribute some of the forces acting on the support member to a larger area adjacent the pinch welds. The external portion or head portion 142a may be joined to an internal portion or stem portion 142b, which is sized and shaped to fit in the side channel 132. In some embodiments, the external portion or head section 142a can have a larger cross sectional area than the internal portion or stem 142b, which is located internally inside the side channel 132. The external portion 142a may have a semicircle cross-sectional shape. Preferably, the head portion 142a is rounded or has smooth surfaces for contacting the vehicle. The head portion 142a can be hollow. Alternatively, the external portion 142a may have a rectangular or trapezoidal cross-sectional shape. The internal portion 142b may have a cross-sectional shape corresponding to the side channel 132 for fixation of the side gap filler 142 to the side channel 132. The engagement can be a detent or snap fit arrangement.

In some embodiments, the side gap filler 142 may be made from a polymer material. The side gap filler 142 may be a compressible elastomer or a semi-rigid to rigid polymer, such as polyether ether ketone (PEEK) or ultra-high-molecular-weight polyethylene (UHMW). In some examples, the surface of the head section 142a can be corrugated to give when pressed and the internal hollow space can be filled with an elastomeric material. In addition to acting as a cushion and weight distributing member, the side gap filler 142 may serve as a dust seal and prevent dirt or debris from getting between the support member 102 and the vehicle 10.

The side wall 124 of the support member 102 may be located adjacent the top wall 122 and the support wall 126. The side wall 124 may be an externally, or laterally, facing wall of the support member 102 when the support member is mounted to the vehicle 10 (FIG. 1). In other words, the side wall 124 may be the wall that is most visible when looking at the vehicle with the support member 102 from a side of the vehicle. The side wall 124 may have a number of different surface contour, shape, or geometry that is selected to provide structural rigidity for the support member 102. For example, an exterior surface of the side wall 124 may have a curvature or be flat for various reasons, such as ground clearance or aesthetics. Additionally, the exterior surface of the side wall 124, or other parts of the support member 102, can be sized and shaped for fitment with one or more steps 104 as described below with respect to FIGS. 3 and 4. In some examples, additional walls may be incorporated. For example, a short fourth wall may be located between the top wall 122 and the side wall 124 to provide additional lines or enhanced geometrical profile. In the example shown, the fourth wall can be seen adjacent the side channel 132.

The support member 102 may have a raw metal finish of the extruded metal material. In other examples, the support member 102 may be painted, brushed, or power coated with a color or multiple colors to match the vehicle or to provide a contrast with the color of the vehicle. The finish may also include indicia, such as pictures, text, numbers, or combinations thereof.

FIG. 2 illustrates an end view of the support member 102 separated from the vehicle 10 and without the pinch weld gap filler 140 or the side gap filler 142. FIG. 2 also shows a single rib wall 134 with more than one rib wall contemplated.

FIG. 3 illustrates an end view of an exemplary embodiment of a support device 100 comprising a support member 102 and mounting brackets 106a, 106b. In some embodiments, the support device 100 can further comprise at least one step 104. For a four-door vehicle, such as a four-door crew cab truck or a four door SUV, the support device 100 can be equipped with two steps 104 so that four steps are provided on two support devices for the four-door vehicle. The steps can be adjustable, slidable, and/or rotatable relative to the body of the support device. For example, each step can have two mounting plates and each mounting plate can be fastened directly to the support member 102, such as to the side wall 124 of the support member. In some examples, the support member 102, such as the side wall 124, can have one or more bolt galleys or channels and the mounting plates at two ends of the step can have bolts or projections that engage and slide within the bolt galleys.

Mounting brackets 106a, 106b can be attached to the support member 102 by welding, adhesives, fastening, detents, or combinations thereof. The two mounting brackets 106a, 106b represent different shaped structures for attaching the support member 102 to the frame of a vehicle. The two different shaped brackets 106a, 106b allow for attachment of mounting flanges on the brackets with different shaped anchors or attachments points on the vehicle. The number of similar or different brackets can vary depending on the vehicle that the support member is to be mounted. Typically the brackets can attach to the vehicle using one or more bolts. In some embodiments, the mounting brackets 106a, 106b can be attached to the I-beam of the support wall 126 and on remote ends to a vehicle. In embodiments, the mounting brackets 106a, 106b can be attached to the underside 16 of the vehicle to fix the position of the support member 102. The mounting brackets 106a, 106b can be slidable or re-positionable along the length of the support member 102 as described in U.S. Pat. No. 9,333,919, the contents of which are expressly incorporated herein by reference.

Additionally, the mounting brackets 106a, 106b may help to distribute the force transmitted by a force acting on the support member 102 to the vehicle 10, in addition to the support member 102 distributing the force as discussed above. For example, the point load on the support member, such as when the vehicle hits a rock or an outcrop, can be distributed along the length of the support member to the pinch weld, as discussed above, as well as to the mounting brackets, which distribute the point load to the mounting points of the brackets 106a, 106b to the vehicle. As such, the mounting brackets 106a, 106b may lessen the force transmitted to the pinch weld 12 by distributing some of the point load to parts of the unibody that the brackets are mounted. The fixation of the mounting brackets 106a, 106b to the vehicle 10 and the support member 102 can also help to ensure the force transmitted through the support member 102 is transmitted directly vertically to the pinch weld 12 to prevent buckling or folding of the pinch weld 12.

In embodiments of the support device 100, only one of the bracket type of the two types shown may be used. Alternatively, two or more of the brackets 106a, 106b may be used. That is, in some embodiments, only one type of bracket is attached to the support member 102 while in other installations other type of brackets are used. A first type of the brackets 106a may be a single piece construction. The first type of bracket 106a may have a through bore for fastening of the first type of bracket 106a to the vehicle 10. In some examples, the brackets resemble those disclosed in U.S. Pat. No. 9,333,919, previously incorporated by reference.

A second type of the brackets 106b may have a base 108 and at least one flange 110. The at least one flange 110 may extend perpendicularly from the base 108. The at least one flange may have a through bores or holes for fastening of the second type of bracket 106b to the vehicle 10.

The brackets 106a, 106b can be sized and shaped in order to conform to the underside 16 of the vehicle 10. Thus, different bracket types may be used in order to conform with different sections and different mounting interfaces on the underside 16 of the vehicle 10. The dimensions of the base 108 and the at least one flange 110 of the second type of bracket 106b may be different from the first type of bracket 106a in order to fit a different section of the underside 16 of the vehicle 10. The brackets can also have different shapes and different geometries for fitment with different vehicles.

In some embodiments, the support device 100 may comprise a step 104. The step 104 can extend laterally from the support member 102. The step 104 may include a step bar 112 and two side pieces 114. The side pieces 114 may attach to the support member 102 and opposed ends of the step bar 112. The step bar 112 and the two side pieces 114 can be attached together by welding, adhesives, fasteners, detents, or combinations thereof. The step 104 may be attached to the support member 102 by welding, adhesives, fasteners, detents, or combinations thereof. In some examples, the step 104 may be similar to and attaches to the support member 102 in the same manner as those disclosed in U.S. Pat. No. 9,333,919, previously incorporated by reference.

FIG. 4 is a perspective view of a support device or rock rail 100 according to the embodiment of FIG. 3. As shown in FIG. 4, the side pieces 114 of the step 104 may be at an oblique angle relative to the step bar 112 but can be oriented at different angles.

Furthermore, in some embodiments, a cap or end cap can be mounted to each end of the support member 102 to prevent dust and debris from entering the hollow interior of the support member 102. The cap can frictionally engage the exterior and/or interior of the support member 102 or be attached by way of detents, fasteners, such as set screws, or other securement means. In an example, the end caps can be similar to and can attach to the support member as provided in U.S. Pub. No. 2019/0235480, the contents of which are expressly incorporated herein by reference.

In some embodiments, the support member 102 may extend from near one wheel well to near another wheel well of the vehicle 10. Alternatively, the support member 102 may be shorter or can vary. The length of the support member 102 between the two wheel wells and the support member 102 contacting the bottom of the pinch weld can help to distribute a point load on the support member 102, such as when the support member 102 is pushed against a rock when the vehicle is operating off road, to a larger range or larger area of the support member to distribute the force over a larger area of the pinch weld reduce the load on any single point or location.

Figure 5:
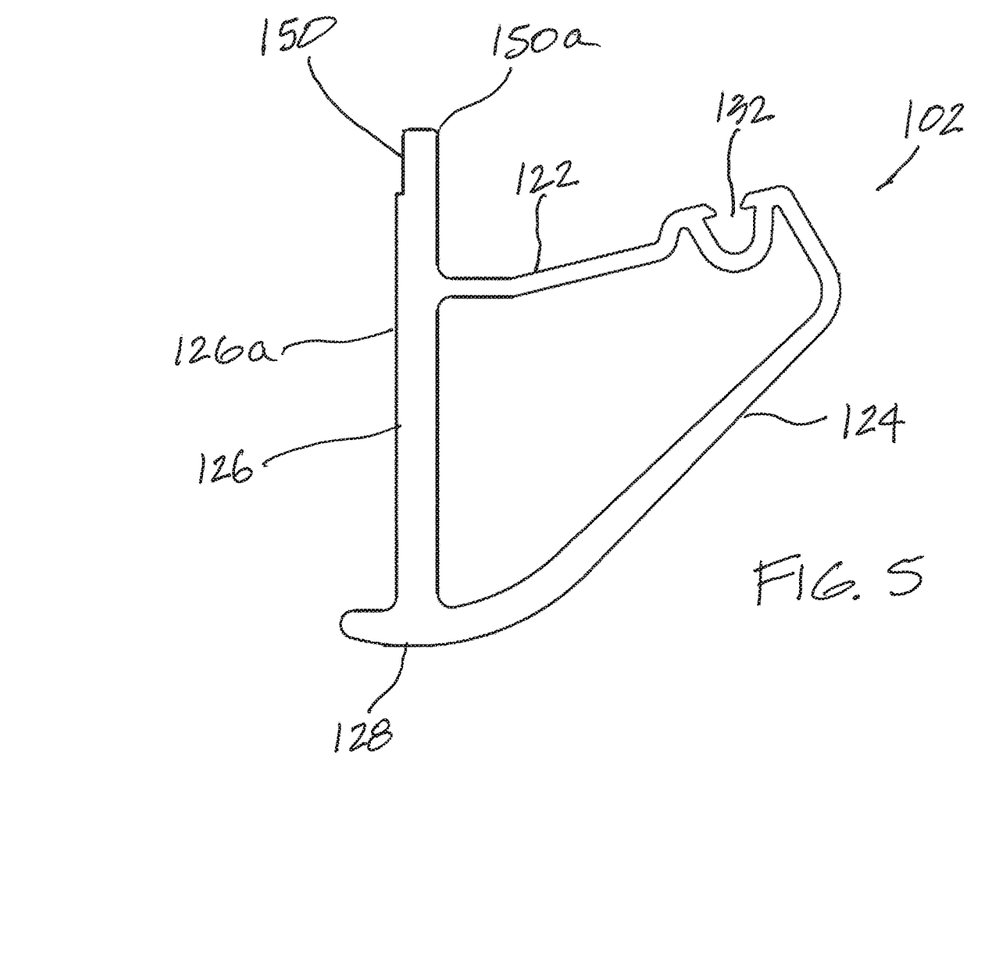
FIG. 5 is a cross-sectional end view of an alternative support member, which can alternatively be referred to as a rock rail.

With reference now to FIG. 5, an alternative support member 102' is shown along an end cross-section. The present support member 102' is similar to the support member 102 of FIGS. 1-4 with some variations. In the present embodiment, the body of the support member 102' is provided with a rigid extension 150 extending above, elevation-wise, the rigid support wall 126. The rigid extension 150 is provided instead of or as an alternative to the pinch weld channel 130 of FIGS. 1-4. In the example shown, the rigid extension 150 can be unitarily formed with the rigid load bearing body 126a. As further discussed below, the present support member 102' may be used in non-pinch weld applications, or for automobiles, trucks, or SUVs without pinch welds. For example, the present support member 102' with the rigid extension 150 may be used with body on frame vehicles.

The present support member 102' with the rigid extension 150 may also be used on vehicles with pinch welds but wherein the rigid extension 150 is aligned to abut against a frame area of the vehicle adjacent to or next to the base of the pinch weld, instead of bearing directly on an edge of the pinch weld. Thus, rather than the tip of the pinch weld resting against a pinch weld channel surface of the support member as shown in FIG. 1, in the present embodiment the rigid extension 150 extends upwardly to abut a structure area of the vehicle adjacent to the base of the pinch weld, as further discussed below.

In an example, the rigid extension 150 can have a length, or the dimension that extends above the intersection with the top wall 122, that can fit a range of vehicles. The length of the rigid extension 150 can be adjusted, such as trimmed, cut, or ground down, for final fit for the particular job or application. In some examples, the terminal end 150a of the rigid extension 150 can be provided with shaped contours, recesses, or surfaces to mate, abut, or engage adjacent structure for mounting.

Although not shown, the present support member 102' can have one or more rib walls for increasing the rigidity of the support member. For example and like the rib wall 134 of FIG. 2, a rib wall can be provided at the intersection between the load bearing body 126a and the top wall 122 and then extending to the side wall or second wall 124.

The present support member 102' can include mounting brackets similar to brackets 106a, 106b shown in FIGS. 3 and 4, those disclosed in the '919 patent, and alternatives discussed elsewhere herein. Brackets can be incorporated to mount the support member to a side of a vehicle. Further, the present support member 102 may include one or more steps, similar to the step 104 shown in FIGS. 3 and 4.

Figure 6:
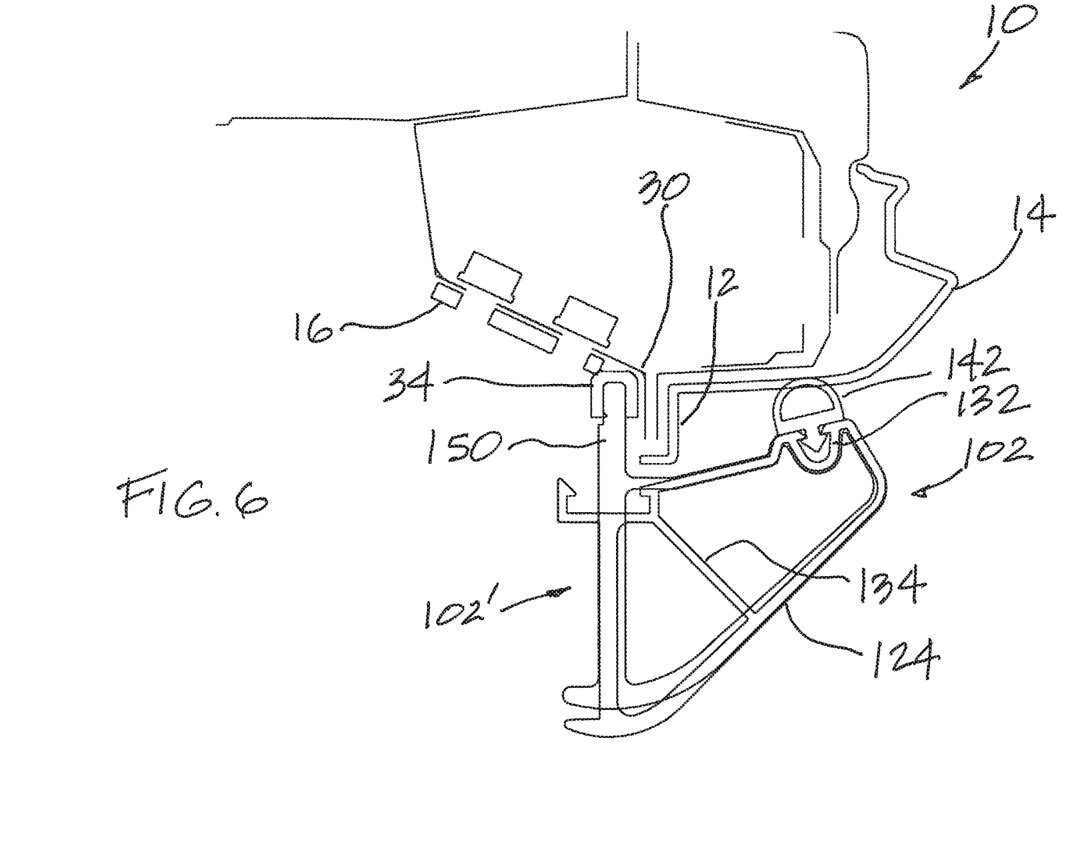
FIG. 6 is a schematic cross-sectional end view of an underside of a chassis of a vehicle and a rock rail mounted to the vehicle, with an overlay of the two different rock rail embodiments.

FIG. 6 is an end cross-sectional view showing a vehicle 10 and the support member 102 of FIGS. 1-4 and the support member 102' of FIG. 5 with the two support members overlay on top of one another to show how the two may be used or mounted to the vehicle. In practice, only one or the other of the two support members is used at a time for mounting to a side of the vehicle. The present view is shown without mounting brackets for mounting one or the other of the two support members 102, 102' to the vehicle for clarity.

As shown, both support members 102, 102' have side channels 132 for use with a side gap filler 142. The side gap filler 142 abuts or rests against the side 14 of the vehicle and is used to avoid metal-on-metal contact. Mounting of the support member 102 of FIGS. 1-4 is discussed extensively above, with reference to FIGS. 1, 3 and 4. When mounting the support member 102' of FIG. 5, the rigid extension 150 extends upwardly and contacts a frame base 30 on the underside 16 of the vehicle 10, typically adjacent a pinch weld 12. In practice when a floor jack is used to raise the vehicle, the pad on the floor jack typically contacts the same frame base 30 as shown. Thus, it is understood to be a strong rigid part of the vehicle 10 for the rigid extension 150 to abut against as if the support member abuts against the end of the pinch weld 12.

In an example, an edge guard 34 can be provided at the terminal end 150a (FIG. 5) of the rigid extension 150. The edge guard 34 can be used as a cushion or a shield to avoid metal on metal contact between the rigid extension and the underside of the vehicle. The edge guard 34 may be a compressible elastomer or a semi-rigid to rigid polymer, such as polyether ether ketone (PEEK) or ultra-high-molecular-weight polyethylene (UHMW). The edge guard 34 can have a channel-like shape, such as a U-shape, to cup around the terminal edge of the rigid extension 150 and can be mounted onto the rigid extension prior to mounting the support member 102' to the vehicle.

The present support member 102' has a length that extends all or substantially all of the length between the front and rear wheel wells of the vehicle 10. Consequently, the rigid extension 150 of the present support member 102' abuts the underside of the vehicle 10, at the frame base 30, along a length of the vehicle. Consequently, when the support member 102' with the rigid extension 150 experiences a point load, such as when pushed from below by a rock, the support member 102' spreads the point load across a larger area of the vehicle, via the rigid extension 150, and the edge guard 34, contacting the frame base 30 of the vehicle. This allows the point load to spread or be distributed over a greater area, via the rigid extension pushing against the frame base 30, so as to reduce the possibility of overloading a single point of the vehicle and possibly causing damage or buckling to the frame of the vehicle. In other words, when a single point load is extended from below against the support member 102', the support member will spread the load along the side of the vehicle that contacts the rigid extension 150 to spread the load across the side of the vehicle that can lift the vehicle rather than cause damage or buckling to the vehicle, which may occur if the support member was not present to spread the point load.

Figure 7:
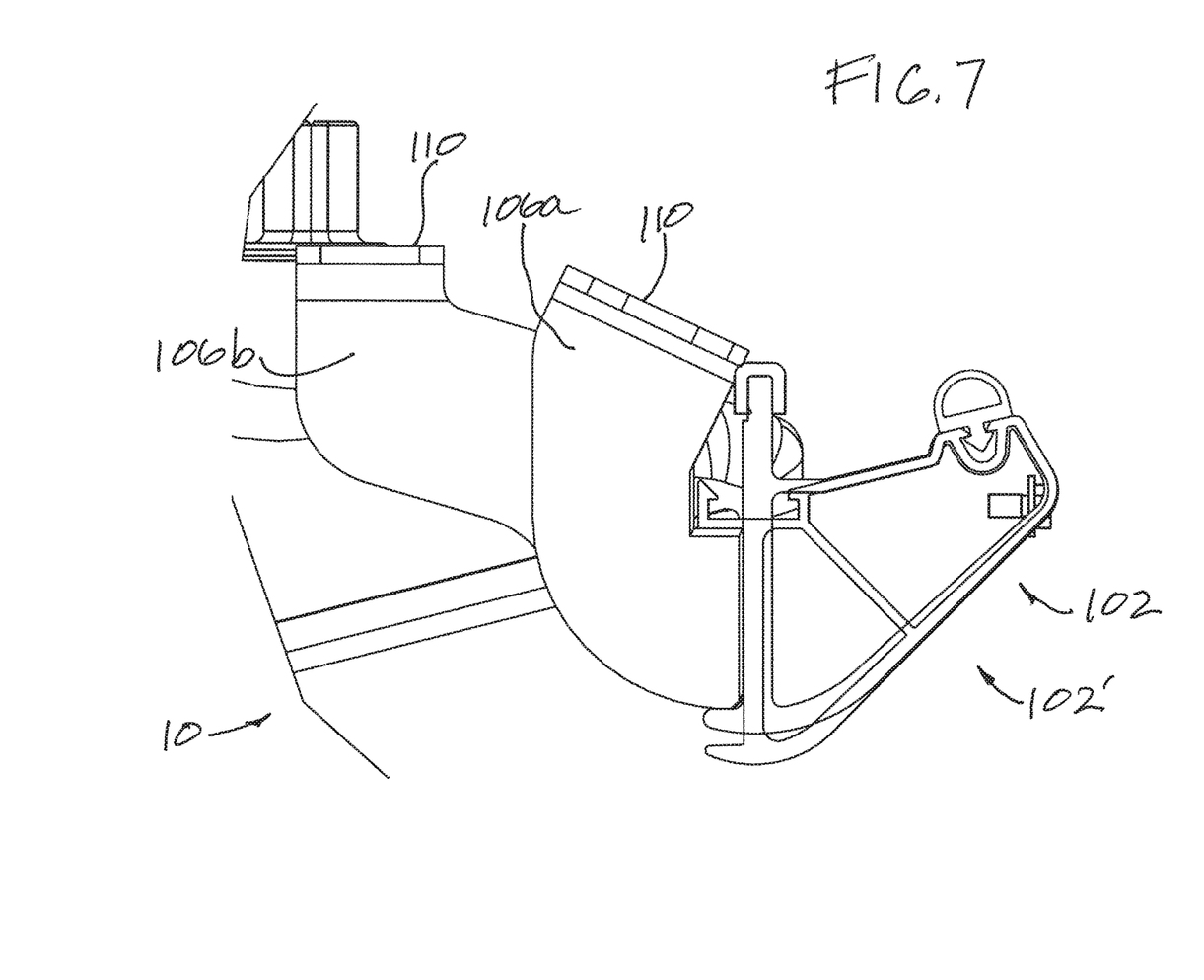
FIG. 7 is a schematic cross-sectional end view showing an overlay of the two different rock rail embodiments and with brackets for mounting to an underside of a chassis of a vehicle.

FIG. 7 is similar to FIG. 6 but with brackets 106a, 106b, which are similar to brackets shown in FIGS. 3 and 4, shown attached to the support member 102. The present view shows the support member 102 of FIGS. 1-4 and the support member 102' of FIG. 5 overlay on top of one another to show how the two may be used or mounted to the vehicle. In practice, only one or the other of the two support members is used at a time for mounting to a side of the vehicle. The present mounting scheme may be practiced as discussed above with reference to FIGS. 3 and 4.

Methods of making and of using the support devices and their components described elsewhere herein, including the disclosed frame locking bolts and adapter brackets, are understood to be within the scope of the present disclosure.

Although limited embodiments of support devices and assemblies and their components have been specifically described and illustrated herein, many modifications and variations will be apparent to those skilled in the art. For example, the various support devices may incorporate custom paint, have different outer contoured shapes, provided with metallic overcoats, etc. Furthermore, it is understood and contemplated that features specifically discussed for one support device embodiment may be adopted for inclusion with another support device embodiment, provided the functions are compatible. Accordingly, it is to be understood that the support devices and assemblies and their components constructed according to principles of the disclosed device, system, and method may be embodied other than as specifically described herein. The disclosure is also defined in the following claims.

What is claimed is:

1. A support device for a vehicle comprising:
a support member defined by a plurality of walls including a support wall, the support member being elongated and including:
a pinch weld channel having a support surface and at least one extended side wall extending from the support surface;
a side channel spaced from the pinch weld channel;
wherein the pinch weld channel is located above, elevation-wise, the support wall and the support wall extends from the support surface at an angle to the support wall; and
wherein the side channel has a recessed groove for receiving a gap filler.

2. The support device of claim 1, wherein the support wall comprises an I-beam cross sectional shape.

3. The support device of claim 2, further comprising two or more brackets welded to the elongated support member or fastened to the elongated support member.

4. The support device of claim 1, further a bracket welded to or secured to the support member, the bracket having a mounting flange for mounting the support member to an underside of a vehicle.

5. The support device of claim 1, further comprising a non-metallic gap filler located in the pinch weld channel.

6. The support device of claim 5, further comprising a non-metallic side gap filler having a head portion and a stem portion, and wherein said stem portion is located in the recessed groove of the side channel.

7. The support device of claim 1, further comprising a rib wall located internally of a body defined by the plurality of walls, said rib wall attached to one of the plurality of walls of the support member.

* * * * *